United States Patent [19]

Hirasaki et al.

[11] 3,868,599

[45] Feb. 25, 1975

[54] SINGLE SIDEBAND FREQUENCY MODULATION SYSTEM

[75] Inventors: Takashi Hirasaki, Sagamihara; Gojiro Suga, Tokyo, both of Japan

[73] Assignee: Rank Xerox, Ltd., London, England

[22] Filed: Dec. 17, 1973

[21] Appl. No.: 425,451

[52] U.S. Cl..................... 332/17, 325/137, 325/139, 332/22, 332/23 R, 332/41, 332/45

[51] Int. Cl............................. H03c 1/50, H03c 3/00

[58] Field of Search........ 332/45, 45 A, 23 R, 23 A, 332/17, 22, 41; 325/50, 136, 137, 139

[56] References Cited

UNITED STATES PATENTS

| | | | |
|---|---|---|---|
| 2,987,683 | 6/1961 | Powers | 325/137 X |
| 3,054,073 | 9/1962 | Powers | 332/23 X |
| 3,323,064 | 5/1967 | Remley | 332/45 |
| 3,715,474 | 2/1973 | Calfee et al. | 332/17 |
| 3,778,718 | 12/1973 | Bass et al. | 325/139 |

*Primary Examiner*—Alfred L. Brody

[57] ABSTRACT

A single sideband frequency modulation system wherein an input signal is divided into high and low-frequency components. The high-frequency component is transmitted as single sideband frequency modulation, and the low-frequency component is transmitted as standard frequency modulation.

2 Claims, 3 Drawing Figures

SINGLE SIDEBAND FREQUENCY MODULATION SYSTEM

BACKGROUND OF THE INVENTION

This invention relates to frequency modulation systems and, more particularly, to a single sideband frequency modulation system wherein signals containing a DC or low-frequency component may be transmitted.

In prior art single sideband frequency modulation systems, the input signal is divided and supplied to two phase shifting circuits which shift the phases of the respective signal components 90° relative to each other. The output from one of the phase shifting circuits is supplied to an amplitude modulator through an integrator and exponential function generator. The output of the other phase shifting circuit is supplied to the same amplitude modulator through a frequency modulator. The output from the amplitude modulator is then transmitted. A problem with this approach arises because as the input signal frequency decreases, the difference between the maximum and minimum values of the exponential function generator output is increased. It therefore becomes difficult to demodulate lower frequency signals, and the exponential function generator and integrator become saturated.

SUMMARY OF THE INVENTION

In accordance with the principles of this invention, apparatus is provided for enabling single sideband frequency modulation of DC and low-frequency signals. The high-frequency component of the signal is utilized to provide single sideband frequency modulation and the low-frequency component of the signal is used for providing the usual frequency modulation of a carrier.

DESCRIPTION OF THE DRAWING

The foregoing will become more readily apparent upon reading the following description in conjunction with the drawing in which.

DESCRIPTION

Figure 1:
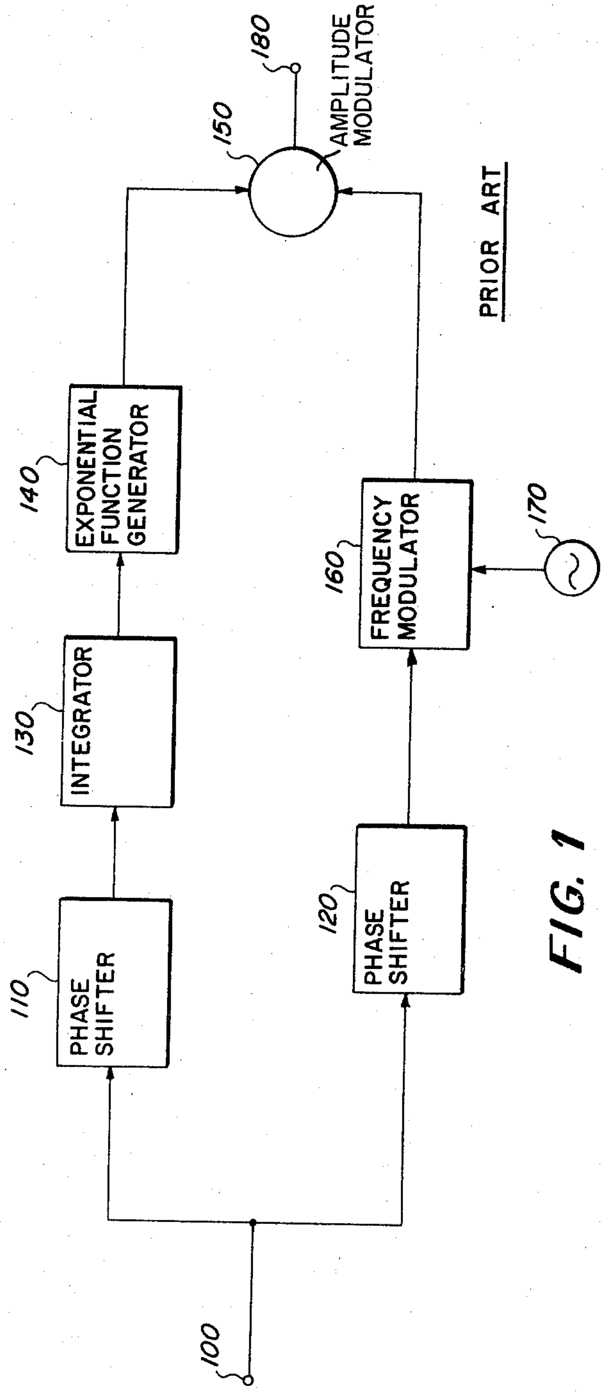
FIG. 1 depicts a block diagram of a single sideband frequency modulation system in accordance with the prior art.

Referring now to FIG. 1, depicted therein is a block diagram of a prior art single sideband frequency modulation system. An input signal which is to be modulated is applied to terminal 100. The signal is then applied to phase shifter circuit 110 and phase shifter circuit 120. The output from phase shifter 110 passes through integrator 130, exponential function generator 140, and is applied as one input to amplitude modulator 150. The other input to amplitude modulator 150 is the output from phase shifter 120 after it has passed through frequency modulator 160, where it modulates a carrier supplied by source 170. The output of amplitude modulator 150 appears at terminal 180 as a single sideband frequency modulated wave, as will become apparent from the following mathematical analysis.

Assuming the input signal applied to terminal 100 is represented by $\cos(\omega_m t - \theta)$, the output of phase shifter 110 is $-\sin\omega_m t$ and the output of phase shifter 120 is $\cos\omega_m t$. These two outputs are phase shifted 90° relative to each other. The output of phase shifter 110 passes through integrator 130 where it is transformed into $\Delta\omega/\omega_m \cos\omega_m t$. This signal is then passed through exponential function generator 140 where it becomes $e^{\Delta\omega/\omega_m \cos \omega_m t}$. The output of phase shifter 120, $\cos\omega_m t$, passes through frequency modulator 160, where it modulates a signal of frequency $\omega_o$. The output of modulator 160 is thus $\cos(\omega_o t + \Delta\omega/\omega_m \sin \omega_m t)$. Amplitude modulating this frequency modulated wave with the output of exponential function generator 140 in amplitude modulator 150 produces the signal wave $$S(t) = e^{\Delta\omega/\omega_m \cos \omega_m t} \cos(\omega_o t + \Delta\omega/\omega_m \sin \omega_m t) \tag{1}$$

The usual frequency modulated wave of a signal $\cos\omega_m t$ modulating a carrier of frequency $\omega_o$ may be expressed as $$S_o(t) = \cos(\omega_o t + \beta\sin \omega_m t) \tag{2}$$

where $\omega_o$ = the angular frequency of the carrier wave $\omega_m$ = the angular frequency of the signal wave, and $\beta = \Delta\omega/\omega_m$ = the modulation index.

In this case, sideband waves are distributed with a deviation of $\omega_m$ above and below the center frequency $\omega_o$ of the carrier.

In accordance with equations (1) and (2) above, the output of amplitude modulator 150 may be expressed as $$S(t) = e^{(\beta \cos \omega_m t)} S_o(t) = e^{(\beta \cos \omega_m t)} \cos(\omega_o t + \Delta \sin \omega_m t) \tag{3}$$

Using MacLaurin's expansion of the above equation, the following is obtained:

$$S(t) = \sum_{n=0}^{\infty} \frac{1}{n} \beta^n \cos(\omega_o + n\omega_m)t \tag{4}$$

It is apparent from equation (4) that $S(t)$ consists of single sideband waves containing no frequency component less than $\omega_0$. Furthermore, it is also apparent from equation (3) that $S(t)$ contains a component $\cos(\omega_o t + \beta\sin \omega_m t)$, the equation of the standard frequency modulated wave. Therefore, if the signal $S(t)$ is passed through a limiter when being demodulated, the standard frequency modulated wave will be obtained.

Figure 2:
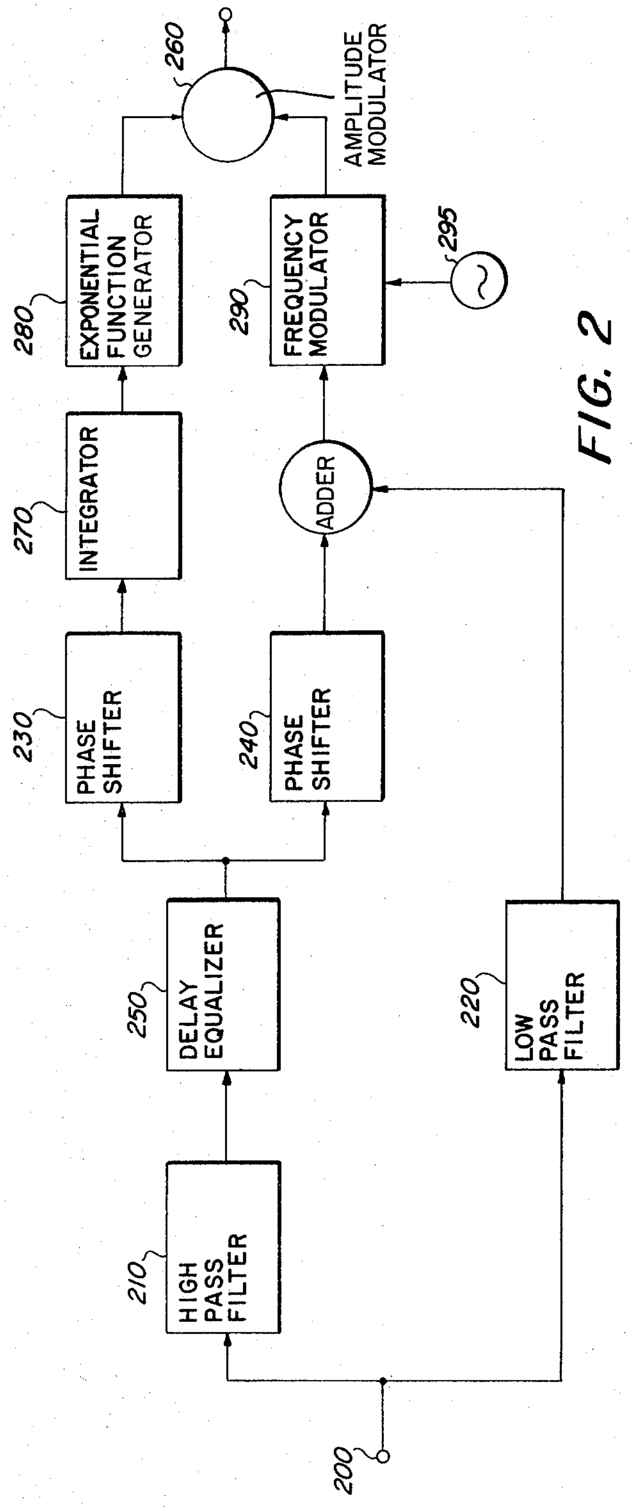
FIG. 2 depicts a block diagram of an illustrative system embodying the principles of this invention.

From the foregoing discussion, it is apparent that as the frequency of the input signal is lowered, the difference between the maximum and minimum values of the exponential function generator output is increased. This causes difficulty in the demodulation of the signals after transmission. The system depicted in block diagram form in FIG. 2 embodies the principles of this invention and overcomes that problem. An input signal to be modulated and transmitted is applied to input terminal 200 and then to a high-pass filter 210 and low-pass filter 220 so as to be divided into high and low-frequency components. The high frequency component from high-pass filter 210 is applied to phase shifter circuits 230 and 240 after passing through delay-equalizer 250. Delay equalizer 250 is provided to compensate for the delay time due to high-pass filter 210.

The output of phase shifter 230 is supplied to amplitude modulator 260 after passing through integrator 270 and exponential function generator 280. The output of phase shifter 240 is supplied to amplitude modulator 260 after passing through frequency modulator 290, where it modulates a carrier from source 295. It is thus seen that the high-frequency component of the input signal is modulated as a single sideband frequency modulated signal in accordance with the description applied to the circuit of FIG. 1. Concurrently, the low-frequency component of the input signal, which is the output of low-pass filter 220, frequency modulates the carrier from source 295 in frequency modulator circuit 290 and is then applied to amplitude modulator 260 along with the high-frequency component from phase shifter 240 so that both components are transmitted as a single sideband frequency modulated wave. However, the low-frequency component does not pass through integrator 270 and exponential function generator 290, so the inherent problems of a low-frequency signal are not encountered. In order to demodulate the output of amplitude modulator 260, the signal is passed through a limiter and then the usual frequency demodulating process may be performed.

Figure 3:
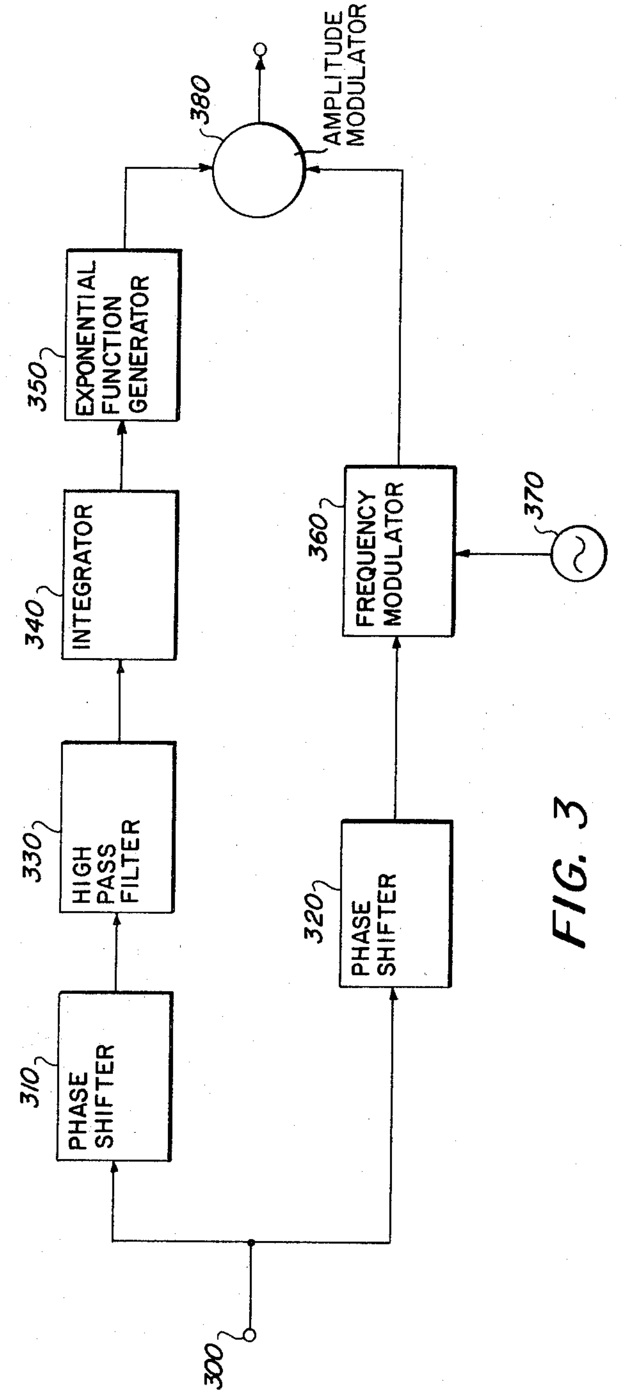
FIG. 3 depicts a block diagram of another illustrative system embodying the principles of this invention.

FIG. 3 shows another circuit embodying the principles of this invention. This embodiment operates in the same manner as the embodiment of FIG. 2 but is simplified because the low-pass filter is eliminated. The input signal is applied to terminal 300 and then to phase shifters 310 and 320. The output of phase shifter 310 is applied to high-pass filter 330 and then to integrator 340 and exponential function generator 350. The output of phase shifter 320 is applied to frequency modulator 360 where it modulates a carrier wave supplied by source 370. The outputs of exponential function generator 350 and frequency modulator 360 are applied to amplitude modulator 380. It is seen that the low-frequency component of the input signal are not applied to integrator 340 and exponential function generator 350, thereby obviating the inherent problems thereof.

Accordingly, there have been shown arrangements for providing single sideband frequency modulation without the problems normally encountered by low-frequency or DC components of the input signal. It is understood that the above-described arrangements are merely illustrative of the application of the principles of this invention. Numerous other arrangements may be devised by those skilled in the art without departing from the spirit and scope of this invention.

What is claimed is:

1. Apparatus for modulating an input signal comprising means separating said input signal into a high-frequency component signal and a low-frequency component signal, means supplying a carrier signal, means frequency modulating said carrier signal with said low-frequency component signal, means single sideband frequency modulating said carrier signal with said high frequency component signal, and means combining the low-frequency modulated carrier with the high-frequency modulated carrier.

2. Apparatus for modulating an input signal comprising a first phase shifter circuit, a second phase shifter circuit, means applying said input signal to said first and second phase shifter circuits, said first and second phase shifter circuits providing output signals phase shifted 90° relative to each other, means supplying a carrier signal, means frequency modulating said carrier signal with the output of said first phase shifter circuit, means providing a high-frequency component signal from the output of said second phase shifter circuit, means integrating said high-frequency component signal, means generating an exponential function signal from said integrated high-frequency component signal, and means amplitude modulating said frequency modulated carrier with said exponential function signal.

* * * * *

UNITED STATES PATENT OFFICE
CERTIFICATE OF CORRECTION

Patent No. 3,868,599 Dated February 25, 1975

Inventor(s) Takashi Hirasaki and Gojiro Suga

It is certified that error appears in the above-identified patent and that said Letters Patent are hereby corrected as shown below:

Column 2, line 34, delete "Δsin" and substitute therefor --βsin--.

Signed and sealed this 1st day of July 1975.

(SEAL)
Attest:

RUTH C. MASON
Attesting Officer

C. MARSHALL DANN
Commissioner of Patents
and Trademarks